Figure 1:
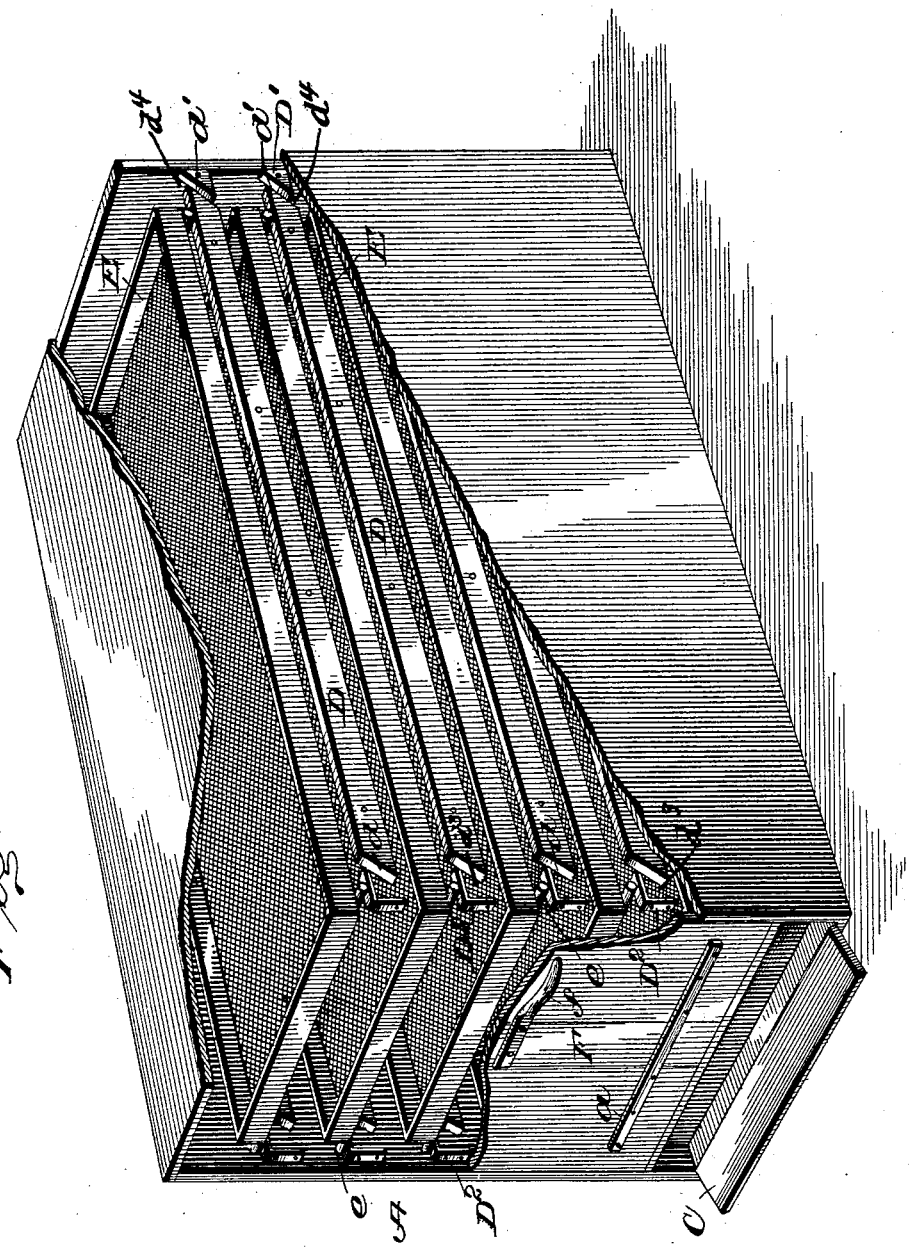

No. 620,793. Patented Mar. 7, 1899.
W. MITCHAM.
FRUIT DRIER.
(Application filed Dec. 24, 1898.)
(No Model.) 2 Sheets—Sheet 1.

Witnesses
Jno Innis
James R. Mansfield.

Inventor
William Mitcham.
By: Alexander N Dowell
Attorneys.

No. 620,793. Patented Mar. 7, 1899.
W. MITCHAM.
FRUIT DRIER.
(Application filed Dec. 24, 1898.)
(No Model.) 2 Sheets—Sheet 2.
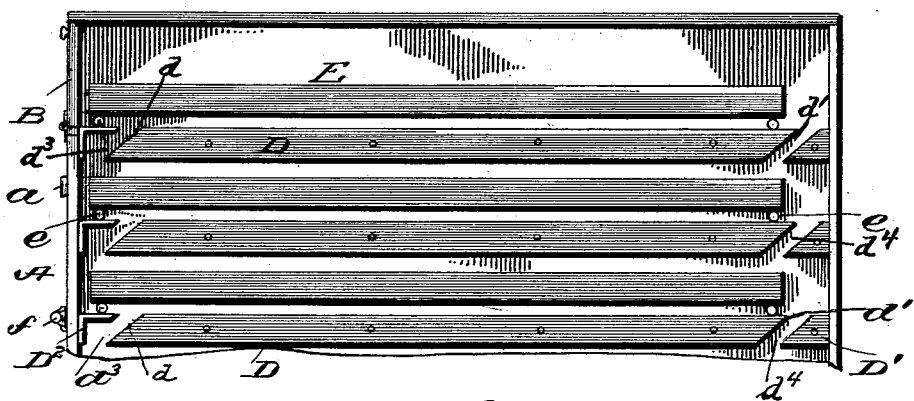
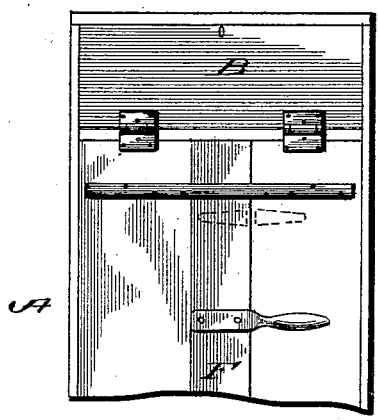
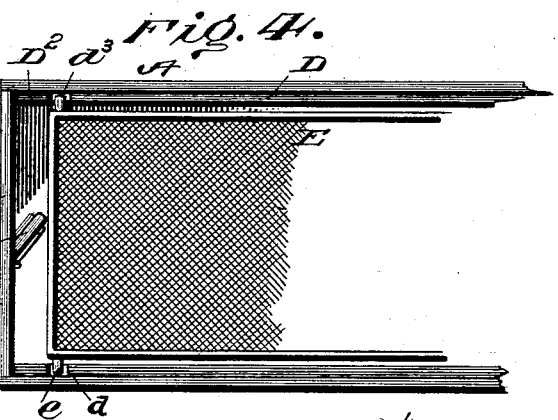
Witnesses
Inventor
William Mitcham
By Alexander Bonnell
Attorneys

UNITED STATES PATENT OFFICE.

WILLIAM MITCHAM, OF OAKVILLE, OREGON.

FRUIT-DRIER.

SPECIFICATION forming part of Letters Patent No. 620,793, dated March 7, 1899.

Application filed December 24, 1898. Serial No. 700,241. (No model.)

*To all whom it may concern:*

Be it known that I, WILLIAM MITCHAM, of Oakville, in the county of Linn and State of Oregon, have invented certain new and useful Improvements in Fruit-Driers; and I hereby declare that the following is a full, clear, and exact description thereof, reference being had to the accompanying drawings, which form part of this specification.

This invention is an improvement in fruit and grain driers; and its object is to enable the drying-trays to be automatically shifted through the drier from top to bottom, so that they will be successively subjected to more and more heat in the operation of the machine. By this construction better results are obtained, as it is well known that it is best to subject the articles to be dried at first to a moderate and preferably damp heat and then to a gradually-increasing temperature until they reach the greatest heat to which it is desired to subject them.

A drier embodying my invention is illustrated in the accompanying drawings, forming part of this specification, and the invention is best summarized in the claims following the description thereof.

Referring to said drawings, Figure 1 is a perspective view, partly broken away, of a drier. Fig. 2 is a detail side view thereof, showing the arrangement of the supports and guides for the trays. Fig. 3 is a detail end view, and Fig. 4 is a detail top view, of parts of the drier.

The drier consists of an outer casing A, which may be made of wood or metal, adapted to be heated in any convenient or desired manner.

The front end of the heater is provided with a transverse inlet-door B at top and an outlet-door C at bottom, both preferably adapted to be tightly closed.

On the inner side walls of the casing are arranged a series of parallel longitudinal bars D, which at their front ends are provided with downwardly-inclined bevels or faces $d$ and at their rear ends are provided with downwardly-inclined bevels or faces $d'$. The faces $d$ of bars D, together with the angular pieces $D^2$, form guides $d^3$, as shown, and guides $d^4$ are formed between the faces $d'$ of the bars D and the triangular pieces D'.

A number of drying-trays E of the ordinary construction are provided to contain the fruit or articles to be dried. These trays are slightly shorter than the bars D and slightly narrower than the space between the opposite bars. The trays are provided near each end with laterally-projecting pins $e$, which may be attached to the tray direct or to slats on the under side of the tray, as preferred. The trays are inserted in the drier through door B. The pins $e$ rest upon the bars D and pieces $D^2$ and support the trays in a horizontal position, as indicated in the drawings. The pins $e$ at the sides of the tray are as far apart as are the guides $d^3$ $d^4$. Consequently if the tray is pushed sufficiently inward the pins $e$ will drop into said guides, and when the tray is released it will by gravity drop down onto the next bar, the pins $e$ passing through the guides $d^3$ $d^4$ and permitting this descent of the tray. As the tray descends, however, it moves forward, so that the pins $e$ will catch upon the next lower bars D and pieces $D^2$ and uphold the tray thereon until it is again pushed backward. The trays may be pushed backward simultaneously by means of a vertical pusher-bar F, hinged to the front end of the casing between the doors B C and provided with an operating-handle $f$, by which it can be swung inwardly, so that it will contact the front ends of all the trays in the drier and push them simultaneously backward.

A cleat or cleats $a$ may be fixed across the front end of the drier to prevent the bar F swinging outward and to stiffen the front end of the case.

From the foregoing it will be observed that the trays are inserted at the top of the casing and are gradually lowered to the bottom thereof, the bottom tray being removed through the door C. Of course if the heat is applied to the bottom of the casing the fresh fruit in the uppermost tray will be subjected to the influence of a moist low heat, while that in the lowest tray is subjected to the action of higher and dryer heat. Whenever a tray is removed from the bottom a new one can be inserted at the top, and whenever it is desired to insert a new tray at the top the bottom bar F can be swung in, pushing back all trays until their pins register with the guides $d^3$ $d^4$. Then the bar is swung outward again, closing the casing, and thereupon all the trays drop by gravity one step or each tray drops into the place previously occupied by the tray immediately below it.

The size and form of the drier can of course be varied and the driers may be made in sections for convenience, and more or less trays may be employed according to the desired capacity of the drier, all such changes being merely matters of construction not involving a departure from the invention.

The simplicity of the construction of the drier and the efficiency of its operation will be apparent from the foregoing description and the drawings.

Having thus described my invention, what I therefore claim as new, and desire to secure by Letters Patent thereon, is—

1. In a drier, the combination of a casing, the tray-supports therein having downwardly-inclined faces forming guides, and trays provided with lateral projections or pins whereby they are supported on said bars, said pins being adapted to register with the guides and permit the descent of the trays by gravity, substantially as described.

2. In a drier, the combination of a casing, a series of parallel tray-supporting devices therein, each provided with downwardly-inclined faces forming guides near the opposite ends of the casing, and the trays provided with pins whereby they are supported on said devices, said pins being adapted to register with the guides and permit the descent of the trays by gravity, from one support to another, when the trays are pushed sufficiently inward, substantially as described.

3. In a drier, the combination of the casing, the horizontal and parallel tray-supports on opposite sides thereof, provided with downwardly and forwardly inclined faces forming guides near their front and rear ends; with the trays provided with pins to uphold them upon the supports, said pins being adapted to register with said guides, when the trays are pushed sufficiently inward, whereupon the trays will descend by gravity onto the next support, and means for simultaneously pushing all the trays backward, so that they can simultaneously descend in the casing, for the purpose and substantially as described.

4. In a drier, the combination of the casing, a series of parallel tray-supports attached to the sides of the casing and having inclined faces forming guides near the front and rear ends thereof; with the trays provided with laterally-projecting pins adapted to register with the said guides (when the trays are pushed sufficiently inward) and allow the trays to descend by gravity from one support onto another, and a movable bar adapted to simultaneously push the trays backward so as to register the pins with the slots, for the purpose and substantially as described.

5. In a drier, the combination of the casing, the upper and lower inlet and outlet doors, a series of parallel bars D, attached to the side of the casing and having inclined faces $d$, $d'$, forming guides near their front and rear ends; with the trays provided with the pins $e$ adapted to register with the said guides (when the trays are pushed sufficiently inward) to allow the trays to descend by gravity from one support onto another, and a vertical hinged pusher-bar adapted to simultaneously push the trays backward so as to register the pins with the guides, for the purpose and substantially as described.

6. In a drier, the combination of the casing, the upper and lower inlet and outlet doors at one end thereof, the parallel tray-supporting bars attached to the opposite sides of the casing and having downwardly and forwardly inclined ends, the pieces $D^2$ opposite the front ends of the bars, and the pieces $D'$ opposite the rear ends of said bars; with the trays having supporting-pins $e$ adapted to uphold them upon the bars and pieces $D^2$ and to also register with the guides or spaces between the bars D and pieces $D'$, $D^2$, respectively, all substantially as and for the purpose described.

7. In a drier, the combination of the casing, the upper and lower inlet and outlet doors at one end thereof, the horizontal parallel tray-supporting bars D attached to the opposite sides of the casing and having downwardly and forwardly inclined ends, the angular pieces $D^2$ opposite the inclined ends of the bars D, at the front end of the casing, and the triangular pieces $D'$ at the rear end of the casing opposite said bars D; with the trays each having laterally-projecting supporting-pins $e$ adapted to uphold them upon the bars and blocks, said pins being adapted to also register with the guides $d^3$, $d^4$, between the bars D and pieces $D'$ and $D^2$, respectively when the trays are pushed sufficiently backward, and the hinged pusher-bar F for simultaneously pushing the trays back, all substantially as and for the purpose described.

In testimony that I claim the foregoing as my own I affix my signature in presence of two witnesses.

WILLIAM MITCHAM.

In presence of—
D. A. WADE,
J. A. FINCH.